United States Patent [19]

Bitcon

[11] Patent Number: 4,932,289
[45] Date of Patent: Jun. 12, 1990

[54] MOTOR VEHICLE DIFFERENTIAL GEAR HOUSING

[76] Inventor: Larry L. Bitcon, 55446 29 Palms Hwy., Yucca Valley, Calif. 92284

[21] Appl. No.: 253,241

[22] Filed: Oct. 4, 1988

[51] Int. Cl.$^5$ .............................................. F16H 57/02
[52] U.S. Cl. ........................................................ 74/606 R
[58] Field of Search ............................................ 74/606 R

[56] References Cited

U.S. PATENT DOCUMENTS

| | | | |
|---|---|---|---|
| 1,604,401 | 10/1926 | Fisher | 74/606 X |
| 2,648,998 | 8/1953 | Stoeckicht | 74/758 |
| 2,734,393 | 2/1956 | Leunberger | 74/606 X |
| 2,755,686 | 7/1956 | Bade | 74/606 X |
| 3,521,504 | 7/1970 | Jorg | 74/606 |
| 3,710,640 | 1/1973 | Stanger et al. | 74/425 |
| 3,715,932 | 2/1973 | Sharp | 74/425 |
| 4,020,715 | 5/1977 | Sollars | 74/606 R |
| 4,084,654 | 4/1978 | Dudek | 180/70.1 X |
| 4,182,199 | 1/1980 | Watson | 74/606 R |

FOREIGN PATENT DOCUMENTS 838208  6/1981  U.S.S.R. .............................. 74/467

Primary Examiner—Rodney M. Lindsey
Attorney, Agent, or Firm—Brown, Martin, Haller & McClain

[57] ABSTRACT

A compact, light weight and easily maintainable differential gear unit casing is provided which comprises a box-like housing having front, rear, top, bottom and two side panels. Each of the front and rear panels has an aperture; which is at least partially axially aligned with each other; and bearing means cooperating with the aperture and demountably secured to the front and rear panels, the bearing means being coaxially aligned with the aligned portions of the apertures on the front and rear panels. Each of the side panels has an opening which is at least partially aligned axially with the other; and axle supporting bearing aligned coaxially with aligned portion of the opening on the side panels and is adapted to have the driving axles journaled in the bearing.

5 Claims, 2 Drawing Sheets

MOTOR VEHICLE DIFFERENTIAL GEAR HOUSING

FIELD OF THE INVENTION

This invention relates to motor vehicle differential gear unit housings.

BACKGROUND OF THE INVENTION

In motor vehicles, the drive axle differential gear system in the power train is an essential component. The primary function of the differential gear system is to translate the engine power through the drive shaft to the wheels for forward and backward propulsion efficiently. At the same time, it must allow one drive wheel to turn faster than the other when the vehicle rounds turns, yet both wheels must receive the proper engine torque.

The traditional design of a differential gear system is characterized by its heavy and rugged construction to absorb the driving force of the wheels. For example, the internal gears of the differential are usually made of high strength hardened steel. Likewise, its casing is made of cast steel. The use of high strength materials provides a large margin of safety in the design and construction of the components. This, coupled with its small number of internal components, makes the differential gear system a relatively reliable piece of equipment in the power train of the motor vehicle. In view of such high reliability, however, maintenance, versatility of mounting and ability to change gear ratio and direction of motion has not always been properly considered and provided for in the design and construction of the system.

A good design should consider not only reliability but also these other aspects of the unit's function and use. As the demand for high performance in motor vehicles increases, new challenges to the traditional designs in equipment and components will also be seen.. For example, the demand for fuel efficiency often dictates the replacement of heavily constructed or rugged components with lighter components or components having different material construction. Likewise, maximizing the power output of the engine often places new stress upon the various parts and components, thereby affecting the overall reliability of the motor vehicle. Other applications, such as racing and off road travel for leisure or military applications, are likely to subject the various parts and components to significant stress factors because of the operating and environmental conditions.

When equipment fails, it must be repaired or restored in a timely manner so as to ensure its availability, i.e., the time that the equipment is operable. When applied to equipment or components, maintainability means the manner in which such equipment or components can be restored to their operable state. As often is the case, a key factor in determining maintainability is the accessibility to the failed or malfunctioned equipment so as to enable the maintenance personnel to diagnose, repair or replace the failed or malfunctioned components.

The traditional differential housing designs do not permit ready accessibility to the gear system or bearings, particularly to change gear ratios or when repairs must be made in the field or in time-critical situations such as racing. In many designs, the housings are made of stamped steel parts welded together. In other designs, the entire housing may be made of cast steel. Accessibility to the interior of most differential gear units is only through a small rear access plate fastened to the housing. However, since all of the bearings and seals are located within the housing itself, any repair or service work to these parts must involve the dismantling of much of the housing and gear system. If the axle is to be repaired or if the gears are to be replaced, the differential housing must be fully disassembled. The traditional design of the differential gear housing thus makes maintenance and repair of the gear system and bearings very difficult.

The accessibility problem is a factor especially serious in a rear engine drive system. In this configuration, the differential gear is usually positioned between the transmission and the engine. Thus, for maintaining or repairing the internal gears or the bearing for the input and output shafts and axles, both the transmission and the engine may have to be dismounted from the chassis of the vehicle before any work can be performed.

Further, for a differential to be truly universal (or "omni") it should be able to be easily re-configured to be able to change the direction of driving motion or to be able to reverse input and output directions.

Accordingly, it would be desirable to have a differential gear housing that is compact, lightweight and easily adaptable to different differential drive configurations. It would also be advantageous to have a differential gear assembly that is easily maintainable. Particularly, it will be highly desirable to have a housing which facilitates repair or replacement of the bearings for the drive shafts and axles without requiring entry of the internal compartment of the differential gear housing. Further, it will be advantageous to have a differential gear housing that is simple to manufacture and easy to install.

SUMMARY OF THE INVENTION

This invention herein provides a compact, light weight and easily maintainable differential gear unit housing comprising a box-like casing having front, rear, top, bottom and two side panels. All panels are demountable for access to any part of the interior of the casing. The front and rear panels each contains an aperture for adapting a bearing casing which is externally demountable for supporting the coaxially configured power and pinion shafts. The side panels contain axially aligned externally demountable bearing housings for the drive axles. The bottom panel is removably secured to close the bottom of the casing to provide accessibility to the internal parts of the differential gear unit.

The preferred embodiments of the invention incorporate a number of features. Vertical ribs on the side panels are provided to increase the structural integrity of and provide cooling to the casing.

PREFERRED EMBODIMENT OF THE INVENTION

Figure 1:
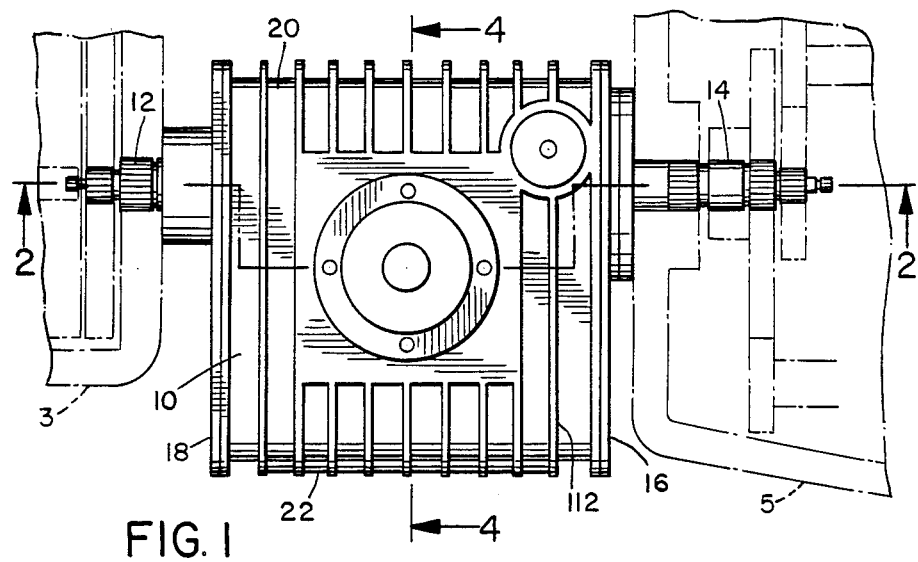
FIG. 1 is a side view showing the relation of a vehicle transmission, differential and torque converter for a rear-drive vehicle, in this case a Volkswagen car.

FIG. 1 shows a differential housing of the present invention positioned between the torque converter or clutch 3 of an engine and a transmission unit 5. In this view the vehicle is a rear drive vehicle with its front to the right, the engine is located at the rear-most portion of the vehicle and the transmission is in the fore position in front of the differential gear unit driving the rear wheels. The configuration would be changed for mid- or front drive vehicles, in a manner which will be evident to those skilled in the art. The power output of the engine is transmitted by way of the torque converter or clutch through the input power shaft of the differential gear unit to the transmission unit. The output of the transmission unit is then translated back to the differential gear unit to engage the drive shaft (which, at times, is also referred to the pinion shaft). In the present arrangement, both the power shaft and the pinion shaft are coaxial, that is the power shaft is rotatably supported within the tubular pinion shaft. Such arrangement of the power train will be useful for many types of motor vehicles, including sports or racing cars, off-road and military vehicles.

Figure 2:
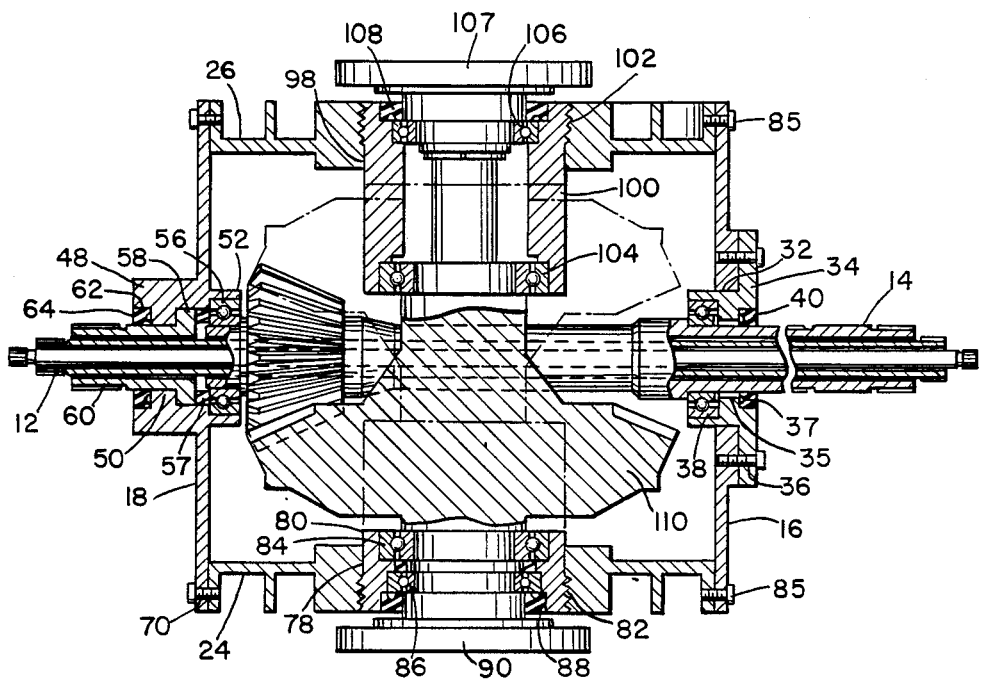
FIG. 2 is a sectional view of the differential housing of the present invention taken on line 2—2 of FIG. 1.

In the preferred embodiment of the invention the differential gear unit housing includes a substantially boxlike casing 10 having a front panel 16, rear panel 18, top panel 20, bottom panel 22, and two side panels 24 and 26, respectively. An opening 32 on panel 16 is provided for accommodating a bearing housing 34. Appropriate mounting means such as bolts may be used for securing the bearing housing 34 onto the front panel 16 as shown in FIG. 2. Bearing housing 34 is secured to the front panel 16 by bolts mounted through holes 36. This means of mounting will facilitate the removal of the bolts and the bearing housing. Other securing means, such as the use of interfitting threads between the front panel opening 32 and the bearing housing 34 for engaging the panel opening 32, may also be used. Thus, as shown in FIG. 2, the installation as well as the removal of the bearing housing 34 may be carried out externally of the differential gear casing assembly without the necessity of opening the casing itself.

In the preferred embodiment of the invention, opening 32 is circular in shape. At the outward side of the opening, a lip portion 35 is provided for the placement of a sealing means, for example, an O-ring 37, for isolating the interior of the differential gear casing from the outside environment. Contained within bearing housing 34 are recesses for the bearing 38 and seal 40. Both the bearing 38 and seal 40 can be secured through the bearing housing 34 by any conventional means, for example, press fit or by interfitting threads between the bearing housing 34 and the bearing 38 and/or seal 40. The choice of the particular mounting means can be readily made by the person skilled in the art. Bearing 38 is to rotatably support the drive shaft or pinion shaft 14. Seal 40, similar to O-ring 37, is intended to provide isolation of the interior of the differential gear unit casing from the external environment.

The end of drive shaft 14 is supported at the rear panel 18. FIG. 2 shows two alternative embodiments of the bearing housing configuration. The first has been described above with respect to the front panel. As with front panel 16, rear panel 18 can have an opening 50 to accommodate a bearing housing. The bearing housing mounted on the rear panel 18 can be similar to bearing housing 34 of front panel 16 in terms of its construction and installation. Also illustrated in FIG. 2 is the alternate configuration in which the bearing housing 48 is incorporated as an integral part of the rear panel 18. The bearing housing 48 on the rear panel 18 has an opening 50 to allow the entrance of the input or power shaft into the differential gear unit casing. Along the inside wall of the rear panel 18, an upraised portion 52 is provided to circumscribe opening 50. This upraised portion 52 is to accommodate a shaft bearing 56 for supporting the drive shaft 14 at its rear-most end. Bearing 56 may be mounted within the upraised portion 52 by any conventional means, such as press fit or interfitting threads. The input shaft 12 rotates within shaft support 60 which has a flange 58 which serves as a stop when the support 60 is fitted into housing 48. Seal 57 prevents loss of the fluid within the unit. At the outermost or outward portion of bearing housing 56 on rear panel 18 is a recess 62 for the mounting of the rear seal 64. Both the rear seal 64 and structure 58 have a diameter for accommodating the input or power shaft entering the differential gear assembly casing.

In the preferred embodiment of the invention, opening 32 on the front panel 16 as well as opening 50 on the rear panel 18 are axially aligned for shaft alignment. Further, the bearing housing 34 on the front panel and the various openings within opening 50 on the rear panel are axially aligned so as to reduce any unwarranted interference with shaft rotation.

As shown in FIG. 2, both the front panel 16 and the rear panel 18 are secured at their respective opposite ends to the two side panels 24 and 26. Holes 70 are provided along the end portions of the panels whereby fastening means such as screws or bolts may be used for joining the panels together.

Side panels 24 and 26 both have openings 78 and 98 respectively fitted with axle bearing housings 80 and 100. These axle bearing housings are mounted the openings 78 and 98, in the side panels by interfitting screw threads 82 and 102. Each of the bearing housings 80 and 100 contains a recessed area for accommodating a bearing 84 or 104 to support the ring gear carrier 110 at its opposite ends. For side panel 24, on the outboard side of bearing 84, a second bearing 86, having a smaller diameter than bearing 84, provides the support to the axle for the drive flange 90. An external seal 88 is installed at the outermost portion of the bearing housing 80 to isolate the internal parts of the differential gear assembly from the external environment. Seal 88 may be mounted upon the bearing housing 80 by press fit or other conventional means.

Similarly, on side panel 26 the bearing housing 100 has an outboard bearing 106 to support the drive axle 107 on the opposite side of the ring gear carrier 110. An external seal 108 is also provided to isolate the interior of the differential gear casing from any external contaminants. Bearing housing 100 has extended depth to allow for support of the ring gear carrier 110 closer to the center of the differential gear unit casing. This arrangement is necessary since the ring gear is located off-center of the longitudinal axis of the drive shaft.

In the preferred embodiment of the invention, the top panel 20 of the differential gear casing 10 is integrated with the side panels 24 and 26. Each of the panels may be individually constructed by casting, forging, machining or other conventional means, or the entire casing may be cast or otherwise formed as a unit. The advantage of such a unit construction is that it eliminates the need for separately aligning the side panels during the assembly of the differential gear unit. On the other hand, it will in many cases be advantageous to have each of the panels separately attached and demountable as indicated with bolts 85 in FIG. 2. As seen in FIGS. 1 and 2, side panels are provided with ribs 112 along the outside of the side panels 24 and 26. The ribs add structural strength to the side panels so as to assure the structural integrity of the differential gear unit and also provide for cooling of the unit.

Figure 3:
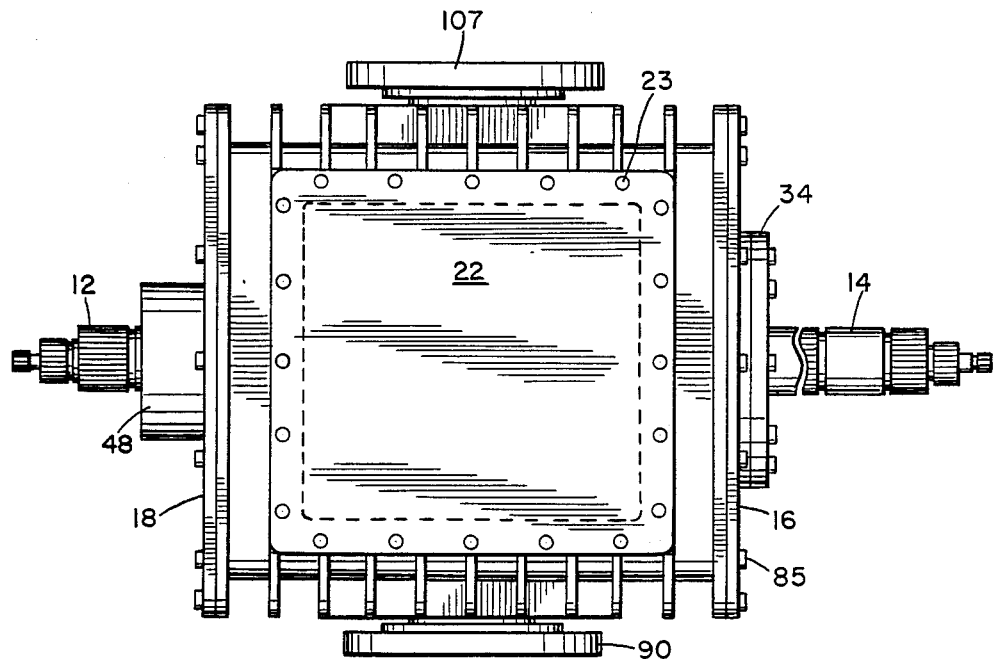
FIG. 3 is a bottom plan view of the differential unit.
Figure 4:
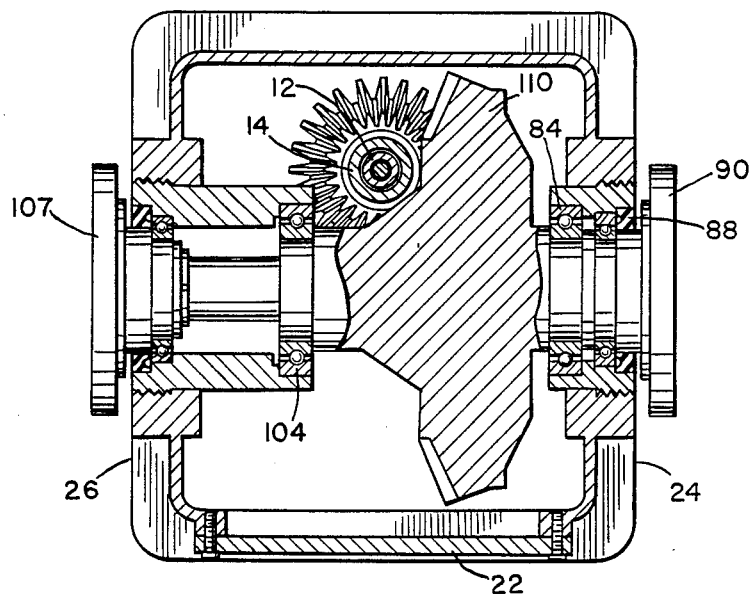
FIG. 4 is a sectional view taken on line 4—4 of FIG. 1.

FIG. 3 shows a bottom panel 22 removably mounted onto the casing to complete the enclosure of the differential gear unit casing and to provide additional shear strength to the casing 10, thereby enhancing the structural integrity of the differential gear unit. The bottom panel 22 substantially covers the entire bottom of the casing. Suitable fastening means 23, such as shoulder screws or bolts and dowels, are provided to secure the closure. These fastening means 23 will be located on the bottom panel 22 such that the stress associated with the bolts will be evenly distributed, so that the panel 22 will serve as a shear plate. When it is necessary to provide service, maintenance or repair to the gears or other components within the differential gear casing, the bottom panel 22 can be unfastened and removed to allow access for the maintenance personnel to the interior components. Since most of the shaft supporting components, that is, the bearings and seals as well as their housings, are not located within the differential gear casing itself, adequate working space will be available to carry out the necessary work.

The foregoing descriptions and figures are given for illustrative purposes only, it being understood that the invention is not limited to the embodiments disclosed, but is intended to embrace any and all alternatives, equivalents, modifications and rearrangements of elements falling within the scope of the inventions defined by the following claims. What is claimed is:

I claim:

1. A motor vehicle differential gear housing comprising a substantially box shaped casing having an interior and exterior defined by front, rear, top, bottom and two side panels, said front and rear panels each having an aperture, said apertures being at least partially in axial alignment;

first bearing means cooperating with said apertures and demountably secured to each of said front and rear panels, said first bearing means being aligned coaxially with the aligned portions of said apertures;

said side panels each having an opening, said openings being at least partially in axial alignment;

axle support bearing housings aligned coaxially with the aligned portions of said openings on said side panels and threadedly mounted therein and adapted to have driving axles journaled in second bearing means in said bearing housings; and at least said front and rear panels being removably attached to said side panels.

2. A motor vehicle differential gear housing as in claim 1 wherein at least one of said first bearing means is mounted in a housing which includes an externally directed flange having fastening means adapted thereon for securing said bearing means onto said front or rear panels, respectively.

3. A motor vehicle differential gear housing as in claim 1 wherein said side panels having vertical reinforcing ribs.

4. A motor vehicle differential gear housing as in claim 1 wherein said bottom panel has incorporated therein an access opening and, removably closing said opening, a detachable cover plate.

5. A motor vehicle differential gear housing as in claim 4 wherein said bottom panel and said cover plate are connected by a plurality of shear pins and said cover plate functions as a shear plate.

* * * * *